UNITED STATES PATENT OFFICE.

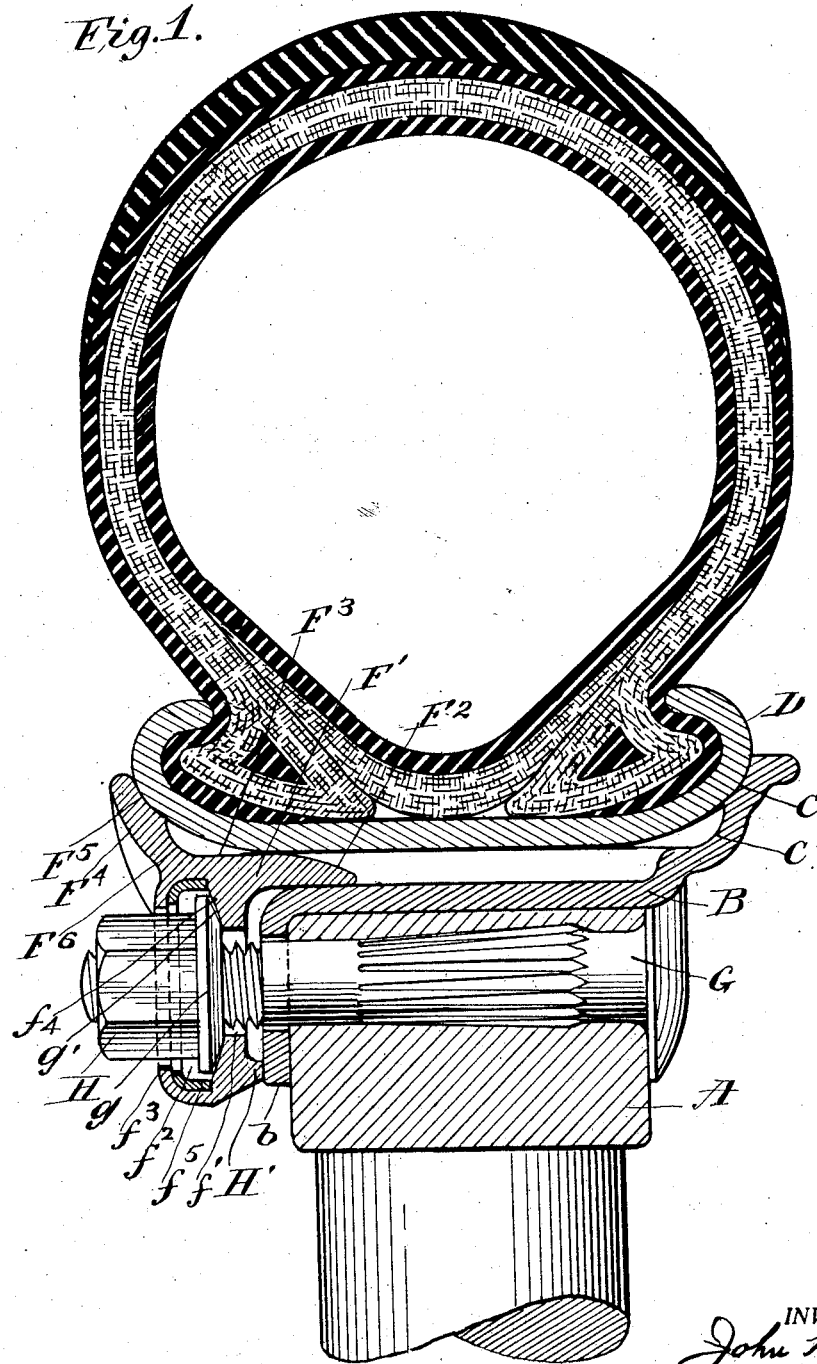

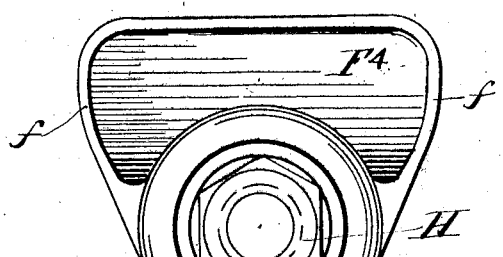
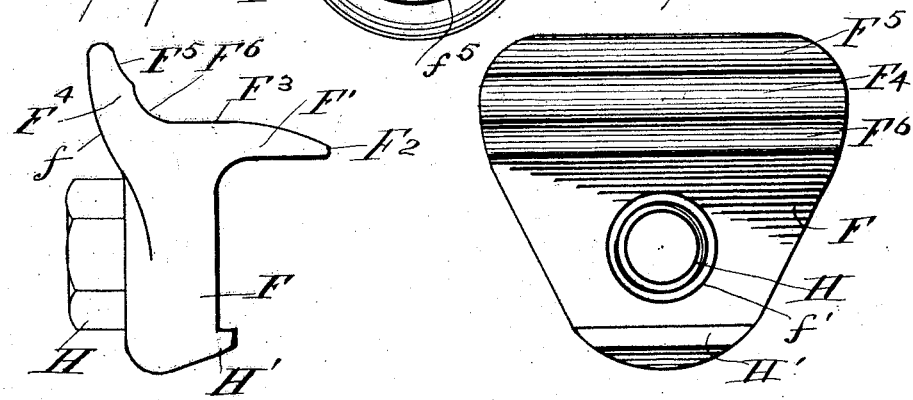
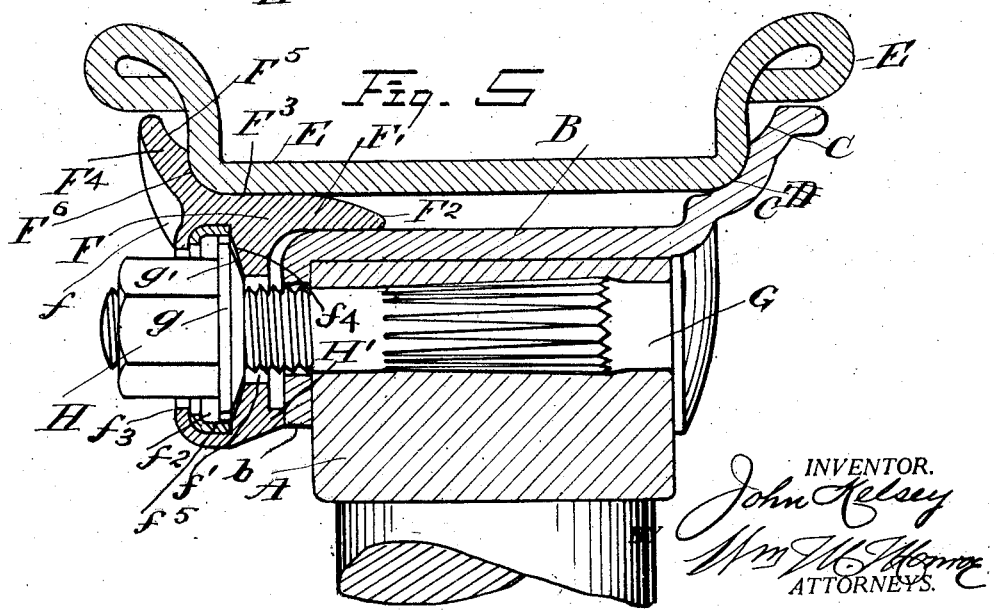

JOHN KELSEY, OF DETROIT, MICHIGAN.

COMBINED SPACING AND CLAMPING DEVICE.

1,206,857. Specification of Letters Patent. Patented Dec. 5, 1916.

Application filed June 8, 1914, Serial No. 843,672. Renewed May 8, 1916. Serial No. 96,249.

*To all whom it may concern:*

Be it known that I, JOHN KELSEY, a citizen of the United States, and resident of Detroit, in the county of Wayne and State of Michigan, have invented certain new and useful Improvements in Combined Spacing and Clamping Devices, of which I hereby declare the following to be a full, clear, and exact description, such as will enable others skilled in the art to which it appertains to make and use the same.

The objects of the invention are to provide a combined spacing and clamping device adapted to interengage the tire holding rim and felly band of an automobile wheel and retain the rim in exact concentric relation to the felly band while detachably securing it in place.

The invention comprises a clamping device having a tongue adapted to extend laterally between the aforesaid rim and band, and through which a bolt passes which is secured in the felly of the wheel. The clamping device is also provided with a flanged member which engages the outer edge of the rim, and a nut adjustable upon the bolt provides means for compressing the rim upon its seat upon the felly band. The clamping device is also capable of a free rocking movement upon the bolt and nut, and the felly band is provided with an inwardly turned flange upon which the clamping device fulcrums to accommodate it to its varying positions in engagement with the rim, and nut.

The invention is hereinafter further described, illustrated in the accompanying drawings, and specifically pointed out in the claims.

In the accompanying drawings Figure 1 is a transverse section showing the assembled parts of felly, felly band, tire holding rim for a clencher tire, and combined clamping and spacing member and securing means therefor; Fig. 2 is a face view of the clamping device; Fig. 3 is a view of the inner face of the clamp; Fig. 4 is an edge view thereof; Fig. 5 is a transverse section showing a rim for a straight side tire, and the felly band and the clamping device.

In these views A is the felly of an automobile wheel, B is the felly band, provided with the inwardly turned flange $b$ on its outer face. The felly band is provided with two seats upon its inner edge, one C which is engaged by the rim D for clencher tires, shown in Fig. 1, and another C' for the rim E for straight side tires, shown in Fig. 5.

The combined spacing and clamping device F comprises a clamping wedge provided with a tongue F' which is inserted between and adapted to engage the felly band and rim and is provided with a wedge shaped extremity $F^2$ and a long level portion $F^3$, which when a number of clamps are positioned at intervals about the rim and felly band, serve to provide bearing surfaces upon which the rim rests, and which serve to space the rim and band apart equally at all parts, to make them concentric with each other. These tongues take the place of spacing projections upon the rim or felly band to prevent indenting or displacing the rim relatively to the band. The clamping device is also provided with an outwardly extending flange $F^4$ which engages the outer edge of each rim, and is provided with two seats $F^5$, $F^6$, which engage the outer edges of the interchangeable rims D and E respectively. Ribs $f, f$, support and connect the flange at its outer edges with the body F of the clamp. A bolt G passes through the felly, the flange of the felly band, and through a large opening $f'$ in the clamp, thus giving a wide range of movement for the clamp longitudinally and transversely thereof.

The clamp is provided with a circular recess $f^2$ in which a nut H is non-detachably but loosely held by means of a turned over edge $f^3$. The nut is adjustable upon the bolt and is flanged at its base at $g$, to prevent its release. The engaging faces of this flange and the base of the recess are curved at $g'$ and $f^4$ to permit of a free rocking movement of the clamp upon the nut and bolt, the large opening in the clamp permitting this action. A smooth washer or bushing $f^5$ in the recess in the clamp prevents friction as the parts move upon each other.

The clamp is provided with a projecting heel H' which engages the inwardly turned flange $b$ upon the felly band and rocks or fulcrums upon it as the wedge is driven between the rim and band; as it rocks upon this heel it moves freely upon the nut and bolt.

As seen in Fig. 1 the "clencher" rim has two bearing points upon the clamp, one upon the flange, and one upon the tongue, thus making a very firm engagement therewith, and in Fig. 5 the "straight side" rim has a firm bearing upon the tongue and the base of the flange, and also the outwardly curved edge e is positioned to strike against the flange of the clamp before it can become bent.

Having described the invention what I claim as new and desire to secure by Letters Patent is:

1. A clamp for use with interchangeable rims, comprising a body having an upwardly extending flange, and a horizontally extending flange, the upwardly extending flange provided with spaced rim seats on its inner face, and the horizontally extending flange having a reduced extremity and parallel faces, said body portion provided with a bolt opening, and with an enlarged recess thereabout having a conical inner face, and a projecting heel at the inner and lower edge of said body portion.

2. The combination with the felly band having a vertical flange and the felly of a wheel, and a demountable rim thereon, of a series of clamps spaced about said band and rim, each clamp provided with a horizontal inwardly extending flange, having parallel faces, and extending between the rim and band, and also having a vertical flange engaging the outer edge of said rim, and provided with spaced bearing recesses for interchangeable rims, and each clamp provided with a horizontal bolt hole, and an enlarged recess thereabout, a heel for each clamp engaging the vertical flange of said felly band, a bolt passing through the opening in said clamp, and through said flange on said felly band and felly, and a nut upon said bolt, said nut having an annular flange on its inner face, and inclosed in said enlarged recess, the said flange on said nut and inner face of said recess provided with corresponding conical surfaces, and an annular bearing ring inclosed in said nut.

3. A combined clamping and spacing device, comprising a body portion, a flattened tongue extending inwardly at right angles thereto at one edge thereof, and an inwardly extending fulcrum projection upon the other edge, said tongue having a wedge shaped extremity and level main portion, a nut non-detachably secured within said clamp and said clamp having a rocking movement therein, and a flange on said body portion, the inner surface of which is in continuation with the outer surface of said tongue, said flange having spaced seats therein.

4. In a combined clamping and spacing device for the purpose specified, a clamp body, a nut non-detachably secured therein, and having longitudinal and rocking movement therein, a fulcrum heel at one side of said clamp body, a tongue upon the other side having parallel engaging faces, and a wedge shaped extremity, and a rim engaging flange provided with spaced rim seats at different levels, substantially as described.

In testimony whereof, I hereunto set my hand this 4" day of June, 1914.

JOHN KELSEY.

In presence of—
WM. M. MONROE,
L. H. MCCRACKEN.